(12) United States Patent  (10) Patent No.: US 6,457,691 B1
Kao  (45) Date of Patent: Oct. 1, 2002

(54) BICYCLE WATER BOTTLE CLIP ASSEMBLY

(76) Inventor: Yu-Ju Kao, 2, Alley 1, Lane 29, Sec. 2, Pei-Shin Rd., Shin-Tien City, Taipei Hsien (TW)

( * ) Notice: Subject to any disclaimer, the term of this patent is extended or adjusted under 35 U.S.C. 154(b) by 0 days.

(21) Appl. No.: 09/756,753

(22) Filed: Jan. 10, 2001

(51) Int. Cl.⁷ .............................. A47K 1/08; A47H 1/16; G09F 7/18
(52) U.S. Cl. .................... 248/311.2; 248/313; 248/302; 248/230.1
(58) Field of Search .............................. 248/302, 230.1, 248/230.5, 311.2, 313, 316.1; 224/41

(56) References Cited

U.S. PATENT DOCUMENTS

| | | | | | |
|---|---|---|---|---|---|
| 3,021,106 A | * | 2/1962 | Kramer | ....................... | 248/226 |
| 3,167,287 A | * | 1/1965 | Collins | ....................... | 248/108 |
| 3,269,683 A | * | 8/1966 | Shinaver | ..................... | 248/230 |
| 3,310,270 A | * | 3/1967 | Cianco | ....................... | 248/210 |
| D283,209 S | * | 4/1986 | Rodriquez | ................. | D12/114 |
| 4,754,902 A | * | 7/1988 | Opfergelt | ..................... | 224/41 |
| 4,957,227 A | * | 9/1990 | Trimble | ....................... | 224/39 |
| 5,390,443 A | * | 2/1995 | Emalfarb | ....................... | 47/67 |
| D372,826 S | * | 8/1996 | Hecker | ........................ | D6/566 |
| 5,626,318 A | * | 5/1997 | Boettger | .................. | 248/205.2 |
| 5,839,632 A | * | 11/1998 | Koday | .......................... | 224/414 |
| 6,095,386 A | * | 8/2000 | Kuo | ............................ | 224/448 |

* cited by examiner

Primary Examiner—Leslie A. Braun
Assistant Examiner—Amy Sterling
(74) Attorney, Agent, or Firm—Bacon & Thomas, PLLC

(57) ABSTRACT

A bicycle water bottle clip assembly. The assembly includes a front grip and a water bottle clip with a fixing device formed by two insertion holes before the front grip is fastened to the stem of the handle of the bicycle. Two insertion sections extend from the water bottle clip to connect the grip and the clip to receive the water bottle provided with a straw at the front end of the stem of the bicycle so that the rider may drink the water as desired, simply by slightly bending forwards without having to remove either of his hands from the handle, thus improving riding safety.

2 Claims, 5 Drawing Sheets

BICYCLE WATER BOTTLE CLIP ASSEMBLY

BACKGROUND OF THE INVENTION

1. Field of the Invention

The present invention relates to a bicycle water bottle clip assembly, and more particularly, to one that is mounted onto the front of the stem for its rider to directly fetch the water bottle with his mouth without leaving his both hands away from the handle.

2. Description of the Prior Art

As illustrated in FIG. 1 of the accompanying drawings, a water bottle clip 10 of the prior art is a frame made of metal stick bent in slightly L shape. Within, one side with a narrower spacing between two vertical sticks is the fixing side, and a fixing plate 102 is provided in between said two sticks 101. Both of said two sticks 101 are bent at right angle to form a lateral support 103 at their bottom. Then the support 103 are further bent upward to form a holding side 104 also approximately at right angle but slightly inclining to the fixing side 101 to hold the water bottle 30 in position. The fixing plate 102 of the water bottle clip 10 is usually fixed onto a down tube 20 of a bicycle. Either riding for exercise or in a rally or highway race, a rider needs to drink water. Therefore, both of the clip 10 and the bottle 30 become a must to the rider particularly when he/she in a long-distance race.

However, since the clip 10 of the prior art is usually mounted onto the down tube 20 as illustrated in FIG. 2, the rider has to use either of his hands to fetch and temporarily move his sight searching for the bottle 30. Such a moment of fetching for the bottle 30 not only distracts the rider but also presents danger to the rider as he has only one hand on the handle.

SUMMARY OF THE INVENTION

The primary purpose of the present invention is to provide a bicycle water bottle clip assembly mounted to the front end of the stem of the bicycle to hold the water bottle provided with a straw. The rider then can directly fetch the water bottle to drink the water simply by slightly bending over without having to leave either of his hands from the handle for riding safety.

The secondary purpose of the present invention is to provide a bicycle water bottle clip assembly. Within, a fixing means of a front grip is provided with two openings for the clip to grip onto the front end of the stem of the bicycle handle for removal of the clip at any time as desired.

DETAILED DESCRIPTION OF THE PREFERRED EMBODIMENTS

Figure 1:
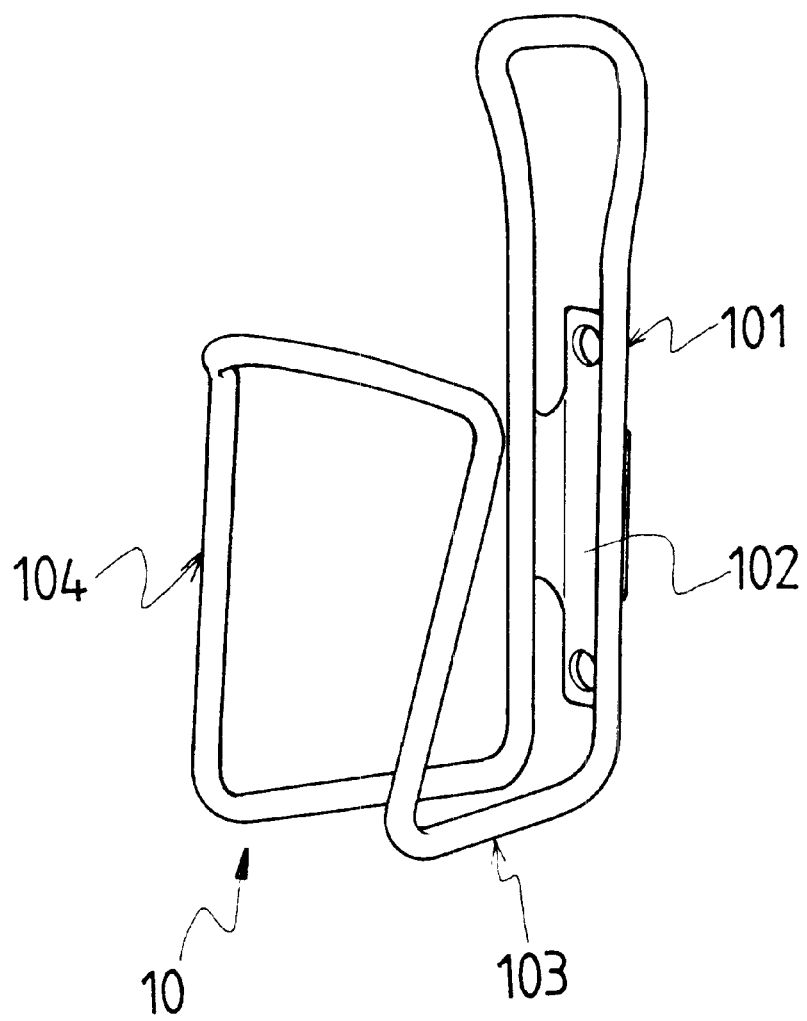
FIG. 1 is an elevation view showing a structure of a bicycle water bottle clip of the prior art.
Figure 2:
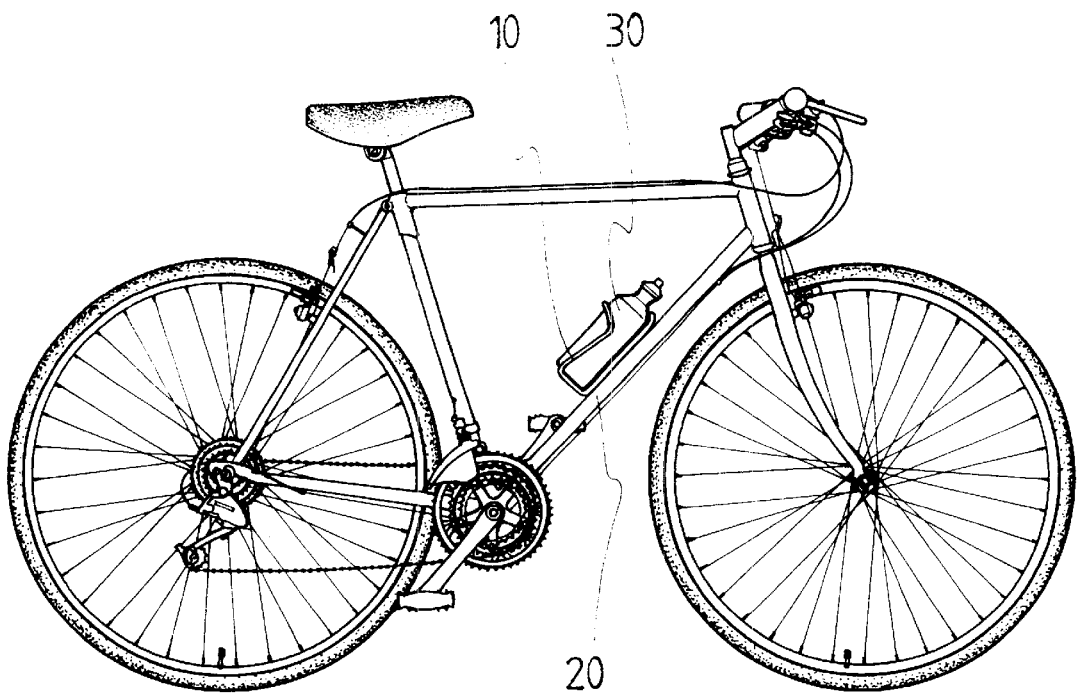
FIG. 2 is a schematic view showing the installation of the water bottle clip of the prior art onto a down tube of the bicycle.
Figure 3:
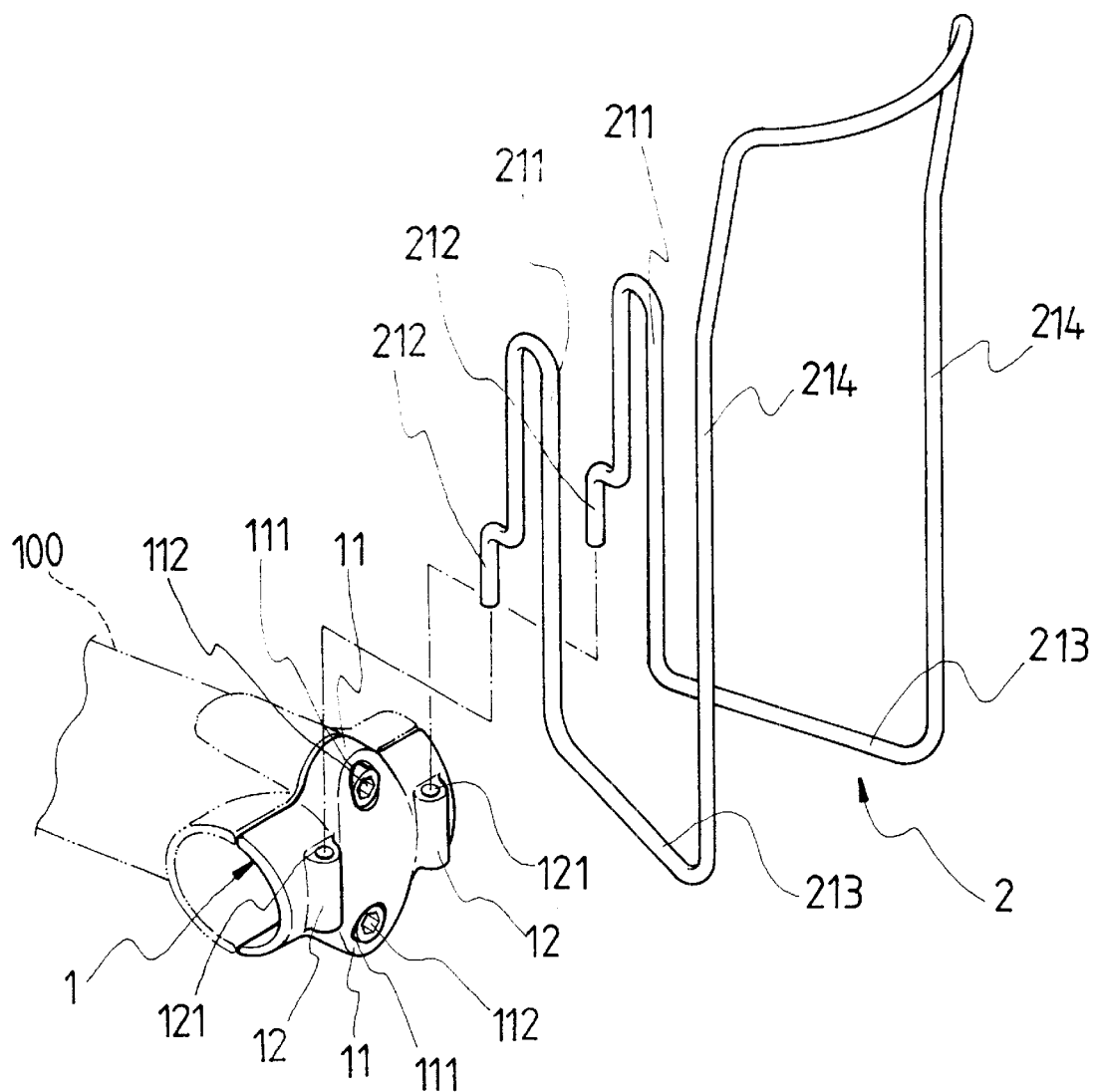
FIG. 3 is a blowout view of the present invention.
Figure 4:
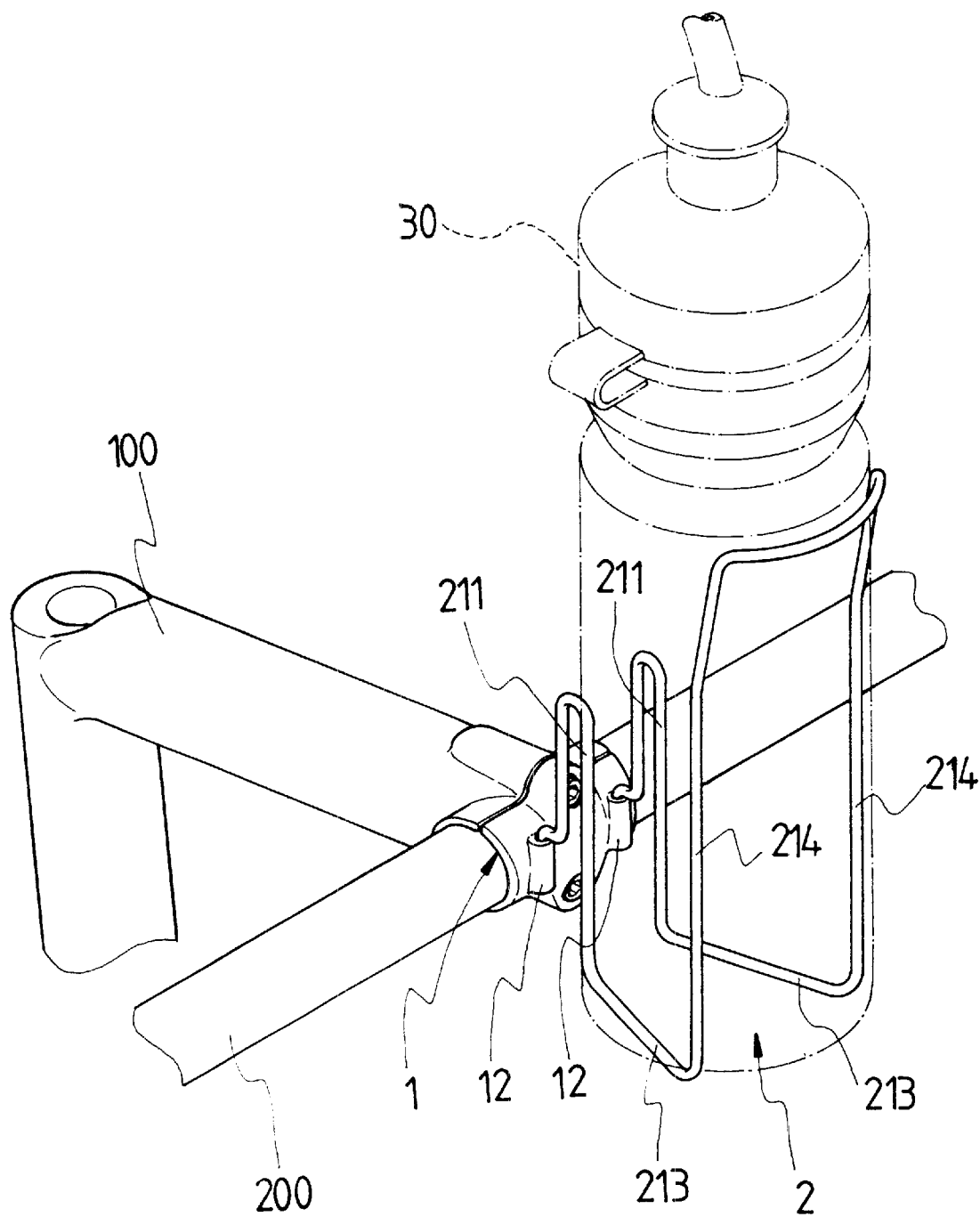
FIG. 4 is an elevation view of the present invention as assembled.

Referring to FIGS. 3 and 4, a preferred embodiment of the present invention of a bicycle water bottle clip assembly is essentially comprised of a front grip 1 and a water bottle clip 2 provided on a stem 100 of a handle 200 of the bicycle. Within, said front grip 1 is an integrated piece in semi-circular shape and a protrusion 11 is each respectively provided above and below the central section of the front grip 1. A hole 111 is provided through the protrusion 11 to insert a bolt or screen 112 for the front grip 1 to be fastened to the front end of the stem 100 of the handle 200. A vertical, hollow post 12 is each provided on both sides before front grip 1 to form together with its opening 121 a fixing means for the front grip 1.

Said bottle clip 2 is made of a metal tube 21 and bent in a substantially "U" shape viewed from its side and an symmetrical frame from its front. Its rear side is defined two vertical sections 211 of said metal tube 21. The upper end of the section 211 laterally and backward extends for a certain distance before further extending downward at a right angle to form an insertion section 212 for insertion. Meanwhile, the lower end of the section 211 also laterally and forward extends to slightly spread up to form a support section 213, which then extends vertically and upward for a longer distance to form a holding section 214. Thus a U-shape container is formed to receive a water bottle 30. The upper ends of both of said holding sections 214 indicate a "n" shape to accommodate the water bottle 30 between the vertical sections 211 and the holding section 214, as shown in FIG. 3.

Figure 5:
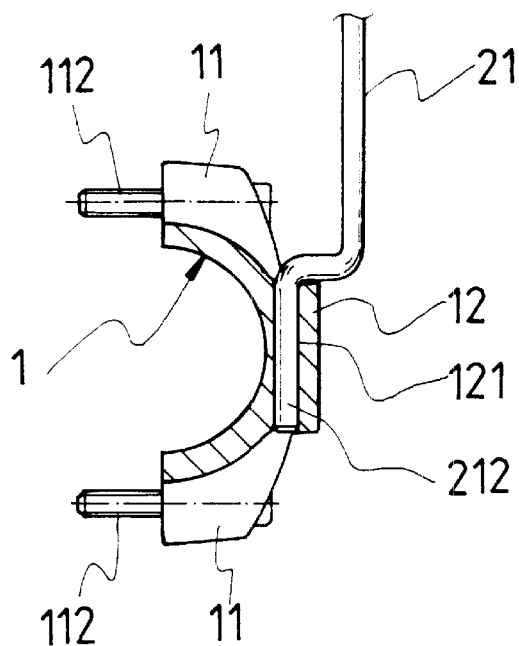
FIG. 5 is a sectional view of the present invention as assembled.

Now referring to FIGS. 4 and 5, the front grip 1 of the present invention is fastened with a bolt or screw 112 to the front end of the stem 100 of handle 200. It is further fixed onto a lateral section of the handle 200 by said front grip 1 to form an integral part of the handle 200 of the bicycle. Each of the insertion sections 212 in the rear of the water bottle clip 2 of the present invention is into the fixing means of the front grip 1, that is, into the opening 121 of the post 12 to mount the water bottle clip 2. The water bottle clip 2 is provided at the front end of the bicycle for easy placement of the water bottle 30 provided with a straw.

Figure 6:
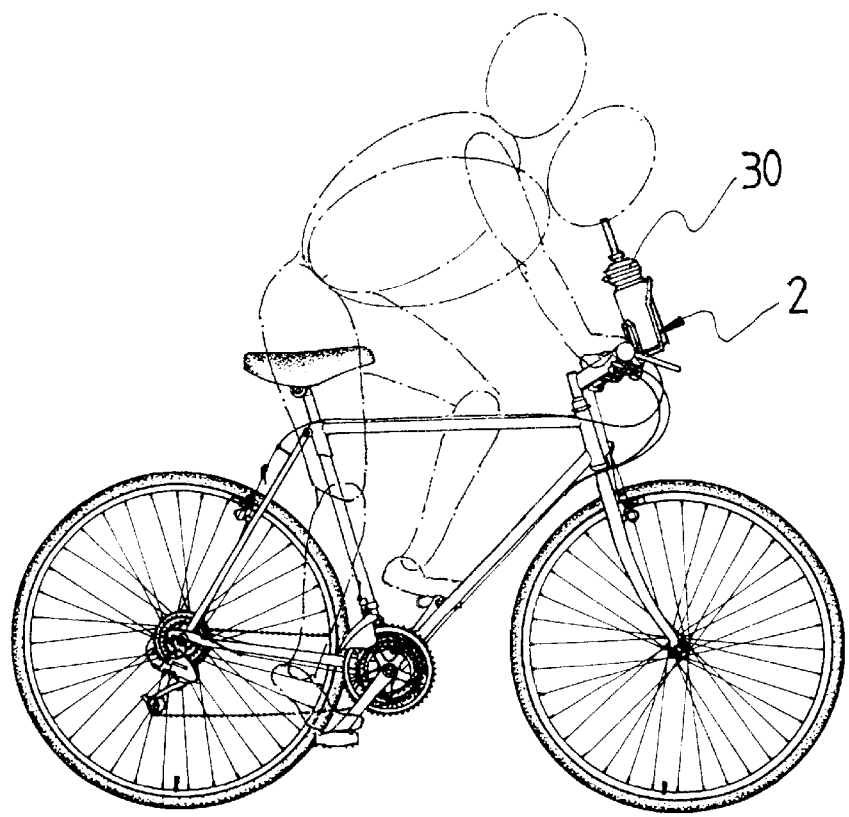
FIG. 6 is a schematic view showing the present invention in use.

A rider, particularly one in rally or highway race, may drink the water by slighting bending over to fetch the straw in the water bottle 30 at anytime as desired. Therefore, the rider is able to keep his/her hands firmly on the handle 200 and eyes on the road for safety reason as illustrated in FIG. 6. Furthermore, the present invention is significantly more practical and effective by the design of the post 12 openings 121 adapted to the insertion sections 212 to connect the front grip 1 fixing means and the water bottle clip 2 allowing easy removal from the stem at any time as desired.

The art of the present invention is essentially comprised of the connection of the fixing means of the front grip 1 and the water bottle clip 2. Nonetheless, the front grip 1 is not limited to an independent member as disclosed in the present invention. For example, it may be provided as an integral part of the stem 100 and a slit is provided for the front grip 1 to be fastened with a screw to the handle 200 for further connection with the water bottle clip 2. Therefore, it is to be noted that any equivalent change and/or substitution shall fall within the scope of the present invention.

What is claimed is:

1. A water bottle clip assembly for a bicycle, the bicycle having a stem on to which a handle is secured thereto, the water bottle clip assembly comprising:

a front grip adapted for being secured to the stem of the bicycle, the front grip comprising a protrusion, said protrusion comprising at least on through hole, the at least one through hole is adapted for receiving a bolt which is insertable through the through hole of the protrusion of the front grip into the stem in order to secure the front grip to the stem, with the handle of the bicycled securable between the stem and the front grip, the front grip further comprises a pair of posts each having an opening.

2. The assembly of the water bottle clip as claimed in claim 1, wherein the front grip is adapted to be integral with the stem of the bicycle, and wherein the bicycle includes a slit adapted to fasten the front grip to the handle of the bicycle.

* * * * *